United States Patent
Bousis

(10) Patent No.: US 7,200,234 B2
(45) Date of Patent: Apr. 3, 2007

(54) FINGERPRINT, CONTROL SIGNAL FOR NEW ENCRYPTION KEY

(75) Inventor: Laurent Pierre Francois Bousis, Brussels (BE)

(73) Assignee: Koninklijke Philips Electronics N.V., Eindhoven (NL)

(*) Notice: Subject to any disclaimer, the term of this patent is extended or adjusted under 35 U.S.C. 154(b) by 873 days.

(21) Appl. No.: 10/244,762

(22) Filed: Sep. 16, 2002

(65) Prior Publication Data
US 2003/0053632 A1    Mar. 20, 2003

(30) Foreign Application Priority Data
Sep. 19, 2001    (EP) .................................. 01203547

(51) Int. Cl.
*H04K 1/00*    (2006.01)
(52) U.S. Cl. ...................................... 380/273; 380/278
(58) Field of Classification Search ................ 380/273; 713/189
See application file for complete search history.

(56) References Cited

U.S. PATENT DOCUMENTS

| 5,325,432 | A | * | 6/1994 | Gardeck et al. ............ 380/273 |
| 5,680,458 | A | * | 10/1997 | Spelman et al. ............. 380/277 |
| 6,826,686 | B1 | * | 11/2004 | Peyravian et al. ........... 713/168 |
| 6,944,770 | B2 | * | 9/2005 | Henderson et al. .......... 713/189 |
| 2002/0003878 | A1 | * | 1/2002 | Olson et al. ................. 380/201 |
| 2002/0110245 | A1 | * | 8/2002 | Gruia .......................... 380/278 |

FOREIGN PATENT DOCUMENTS

EP    1054546    11/2000

* cited by examiner

*Primary Examiner*—Gilberto Barrón, Jr.
*Assistant Examiner*—Roderick Tolentino

(57) ABSTRACT

For transmitting an information string from a source entity to a destination entity the information is encrypted through a time-sequence of encrypting keys that are each valid only in a predetermined associated time interval within the string. The destination entity is presented with control information regarding a changeover instant between two particular encryption keys. In the information string, a data block is singled out at a predetermined localization in the string relative to a changeover that is known to the destination entity, and the data block is encrypted with an actually valid encryption key. A fingerprint is formed of the encrypted data block and transmitted at the predetermined localization instead of the encrypted data block. The encrypted data block is transmitted in an out-of-band control message which indicates that an update occurred.

15 Claims, 5 Drawing Sheets

$\Delta_{FIFO\ buffer}$ = max delay an out-of-band message may have proposed solution:

$\Delta_{total} = \Delta_{FIFO\ buffer} + \max(\Delta_{comparison}, [\Delta_{update\ key}] + \Delta_{decryption})$ as opposed to:

$\Delta_{total} = \Delta_{FIFO\ buffer} + \Delta_{fingerprint} + \Delta_{comparison'} + [\Delta_{update\ key}] + \Delta_{decryption}$

FINGERPRINT, CONTROL SIGNAL FOR NEW ENCRYPTION KEY

BACKGROUND OF THE INVENTION

The invention relates to a method for transmitting encrypted information as recited in the preamble of claim 1. The encryption of data streams should protect against eavesdropping thereof, or other interfering therewith by unauthorized entities in view of the commercial and other hazards that such eavesdropping or interfering could cause. For improved security, the encryption key or keys should be repeatedly exchanged for another key or keys that could not readily be derived from an earlier key. In the present invention, the transmitter, sender, or source entity will initiate the transition to another key, in general, both as regards to the content of the new key(s), and also as regards to the instant of transition. In the ambit of the present invention, the receiver is presumed to know what the next encryption key should be, and therefore, what decryption key to apply next. Now, the receiver entity has somehow to be notified of the exact position in the encyphered data stream where the transition to the new key has taken place, to allow the destination to changeover to an appropriate new decrypting key or keys. The purpose of such notifying is that in principle all encrypted information should be useful to the receiver, and furthermore, that the encryption process should be executed in a straightforward manner, without any necessity for backtracking or other deviation from decrypting with only the proper key or keys.

Now, EP 1 054 546 describes how to include in the encrypted data a binary flag that at certain instants will signal the receiver to changeover to the next decryption key. This procedure will evidently diminish the channel transfer capability for the necessity to repeatedly transmit the flag, and moreover, may also allow an eavesdropper to detect the instant of such changeover.

SUMMARY TO THE INVENTION

In consequence, amongst other things, it is an object of the present invention to allow a fail-safe detection facility for the receiver as regarding the precise instant of the changeover, while still maintaining the transfer capability of the data channel substantially at its standard value.

Now therefore, according to one of its aspects the invention includes a method where, in an information string, a data block is signaled out at a predetermined localization in the string relative to a changeover instant between two particular encryption keys, which localization is known to a destination entity; encrypting the data block with an actually valid encryption key; forming a fingerprint of the encrypted data block; transmitting the fingerprint at the predetermined localization instead of the encrypted data block; and transmitting an out-of-band control message for indicating that an update occurred. In many situations, a virtual or real control channel will be present anyhow at a relatively low transfer rate, and the additional use thereof for synchronizing the receiver with the changeover positions between the various encryption keys will not impede the transfer on the main data channel.

The invention also relates to a method for receiving such encrypted information, to an apparatus for executing such transmitting or receiving, respectively, of encrypted information, to a system comprising linked apparatuses for executing both such encrypting and decrypting, respectively, and to a signal arrangement having been encrypted according such method. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
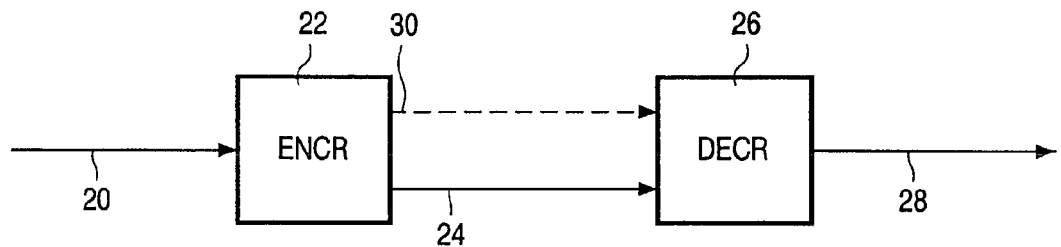
FIG. 1, a basic sketch of a secured link.

FIG. 1 illustrates a basic sketch of a secured link. At left, unsecured content 20 is being routed inside the transmitter environment, so that protection of this content may be provided by mechanical blocking of unauthorized access undertakings, and the like. Block 22 represents the encryption at the sender entity that will produce secured content 24, next to a certain amount of control information 30. Generally, the transfer rate of control information stream 30 will be much lower than that of content stream 24. The control information may serve various purposes next to the encryption procedures to be disclosed hereinafter, such as message synchronization, addressing, and other functions that by themselves would not need inherent protection against eavesdropping. In the context of the present invention, the control includes information that supports detection of the transition from one encrypting key by another, so that there will be no "glitches" in the unsecured content that the decrypting will produce at the system output.

The control channel may be a real channel, such as a separate frequency band or physical channel, or rather a virtual channel, such as being provided by particular bit positions that would be necessary anyway. Usually, the first situation will apply.

Now, receiver block 26 will execute the decrypting procedure to ultimately reproduce unsecured content 28. The nature of the transmitting and receiving facilities, and also the overall structure or usage of the transmitted data are generally inconsequential to the present invention.

Figure 2A:
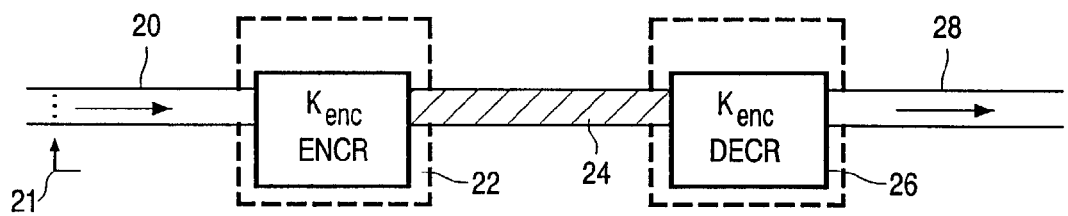
FIGS. 2a–2c, a basic sketch of a key update flow.
Figure 2B:
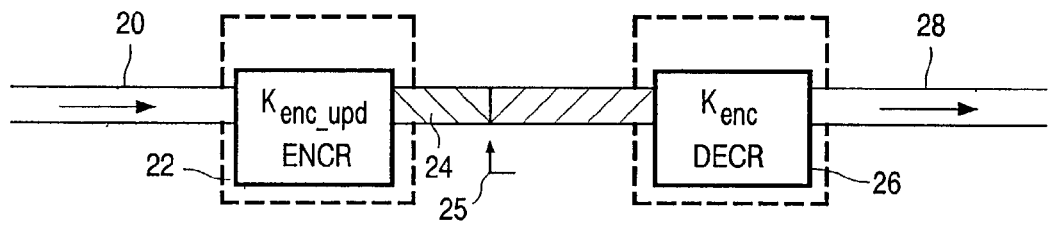
Figure 2C:
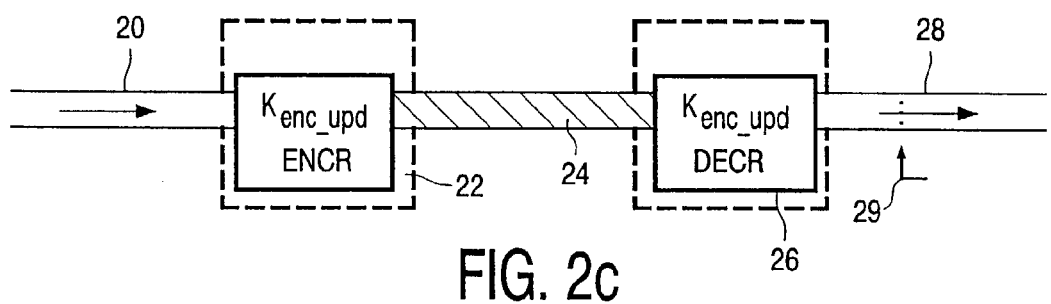

FIGS. 2a–2c illustrate a basic sketch of a key update flow. According to the present invention, the encryption requirement will not allow to insert additional bits next to what is necessary to transmit the secured content proper, nor allow the compression of the content. In such situation, all control information must be transmitted out-of-band. Therefore, there is not necessarily a strict temporal connection between the two information structures 24, 30 in FIG. 1, but a delay, possibly a variable one, may therebetween be present. An example of such secured link being planned for the future is a so-called SPDIF standard that will protect all of a digital audio band between a compliant source device and a compliant destination device. Of course, other transfer than audio, such as video or multimedia would potentially benefit from the present invention.

In FIG. 2a, the transition to the next encryption key at the source device 22 has not yet been effected but is planned for execution, as indicated by arrow 21. In FIG. 2b, the transition has at the source device 22 been effected indeed, so that its actual notional location may be suggested by arrow 25. Note that input or output buffers at the two interconnected facilities could give such arrow 25 a physical meaning. In FIG. 2c, the transition to the next encryption key has arrived at the destination facility 26, so that after correct decrypting its location in the furthermore unsecured stream 28 may be indicated by arrow 29. Note that corresponding items in FIGS. 1, 2a–c generally carry identical reference numerals.

Figure 3:
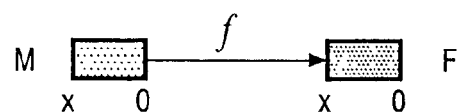
FIG. 3, a basic sketch of a key update function.

FIG. 3 is a basic sketch of a fingerprint function. The definition of a fingerprint is herein a function $f$ with uniform distribution that uniquely maps a data message M of arbitrary size on a fingerprint message F of fixed size. It should be impossible to retrieve F from M, without knowledge of $f$, and it should likewise be impossible to retrieve M from F, the latter even so with having knowledge of $f$. By itself, the fingerprint principle is state of the art. Now, every time the sender plans to update an actual encryption key, it will generate a fingerprint F, as based on the latest x=M bits of the secured data stream that immediately precede the updating of the encryption key. Next, the sender will replace those last x bits in the secured data stream by the equally sized fingerprint that the sender had just generated. Furthermore, the sender will then immediately change to the new encryption key and furthermore transmit an out-of-band control message to the receiver to indicate that changeover had occurred. In particular, the payload of the latter control message on the control channel will precisely include the x bits that were used to generate the fingerprint. In principle, the fingerprinted block may be generated somewhat earlier in the encrypted information stream, provided that the receiver would then know the position where to effectively change to the new decryption key. The offset so introduced need in principle not be uniform over all of a sequence of key changes, but may indeed variable. Also, a variable delay may be introduced between the control message and the secured content containing the changeover between successive encryption keys.

Figure 4A:
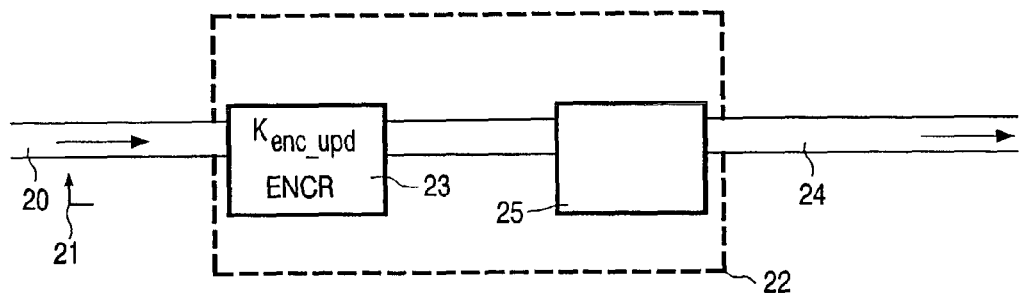
FIGS. 4a–4c, a basic sketch of an encryption key update at the transmitter side.
Figure 4B:
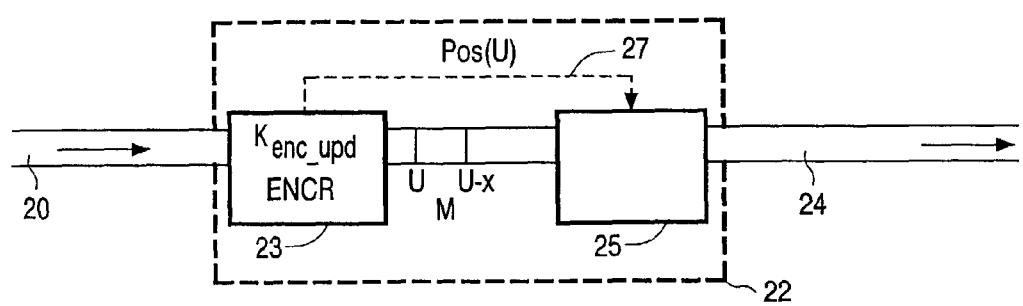
Figure 4C:
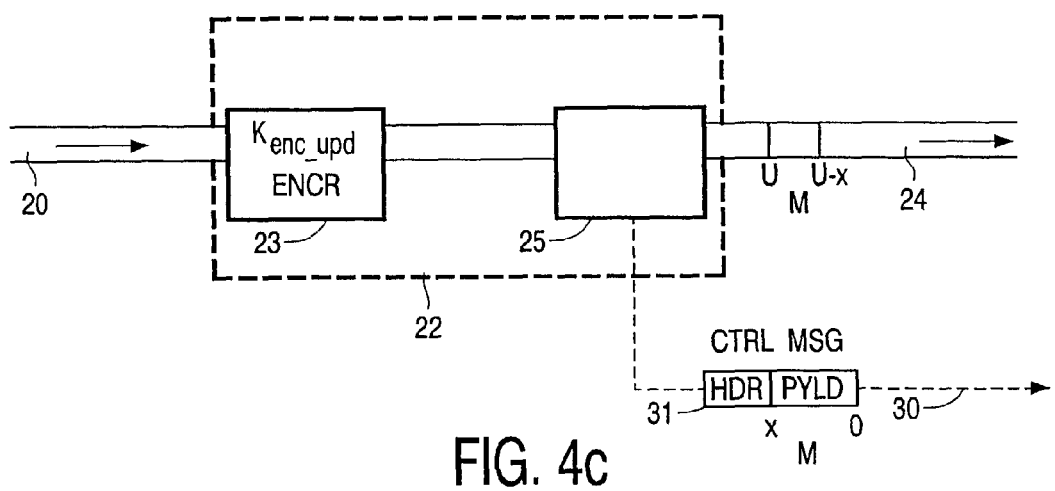

FIGS. 4a–4c represent a basic sketch of an encryption key update at the transmitter side. Here again, corresponding items in FIGS. 1, 4a–c are generally carrying identical reference numerals. Now, FIG. 4a shows the situation well before the changeover to the new key. In FIG. 4b, the encryption has been changed as from the position U. Furthermore, the final block M of x information bits before the changeover has been indicated. Also, the position of the changeover by means of facility 27 is signalled to the entity 25 that must generate the fingerprint of block M. Finally, FIG. 4c depicts the situation where facility 25 had done its work by fingerprinting block M to a block F. Moreover, an out-of-band control information block 31 containing M is transmitted to the receiver. This control block as indicated will contain some header information plus the payload M.

Figure 5A:
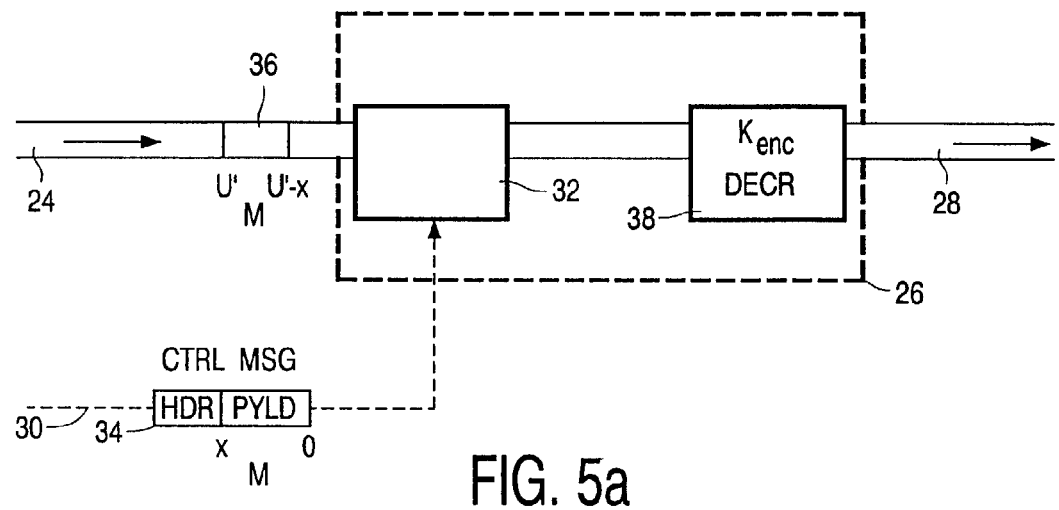
FIGS. 5a–5c, a basic sketch of a decryption key update at the receiver side.
Figure 5B:
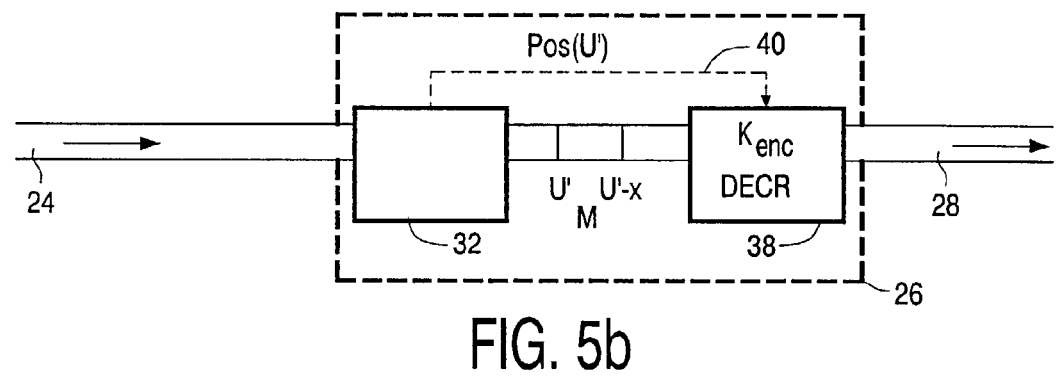
Figure 5C:
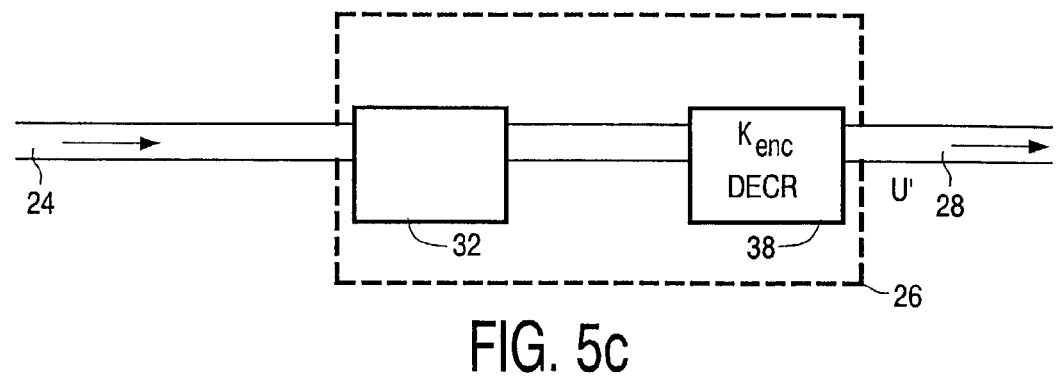

FIGS. 5a–5c represent a basic sketch of a decryption key update at the receiver side. Here again, corresponding items in FIGS. 1, 5a–c generally carry identical reference numerals. The receiver will feature a FIFO buffer included in item 32 that is large enough to accommodate the maximum delay that the out-of-band information might have. Upon in FIG. 5a receiving the control message 34 over out-of-band channel 30 indicating that the sender had updated its encryption key, the receiver will in block 32 generate a fingerprint of the control message M, and subsequently continually search the contents of its FIFO for finding a match with the fingerprint that it had itself just generated. When such a match is found, the receiver will replace the x bits 36 from the match in the FIFO by the x bits originally received in the message (=M) in the control payload, and will update its actual decryption key after having decrypted the last bit from the control message (M) that was just replaced. FIG. 5b shows the situation after such replacing, wherein the encrypted information M is indeed being forwarded to the decryption facility 38 proper. Furthermore, along interconnection 40, the decryption is informed on the precise position of the transition, to allow optimum applying of the new decrytion key. Finally, FIG. 5c illustrates the situation where the decryption key has been changed successfully, so that the position U' of the encryption key change is no longer of relevance.

Note that the solution provided by the invention is most suited to secure links where a block cipher algorithm is being used for encryption/decryption. It may however still be used in situations wherein a stream cipher is used through in such situation providing an additional x-bit buffer facility.

Figure 6A:
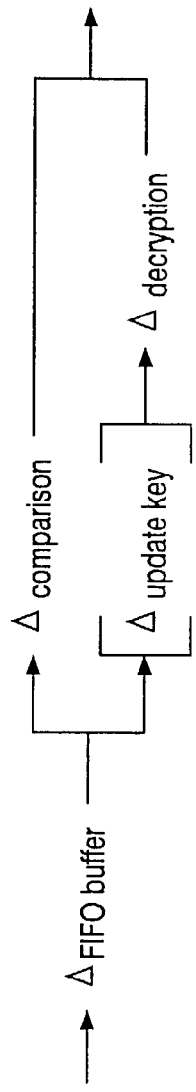
FIGS. 6a–6b, a basic sketch concerning the reduction of delay at the receiver side.
Figure 6B:
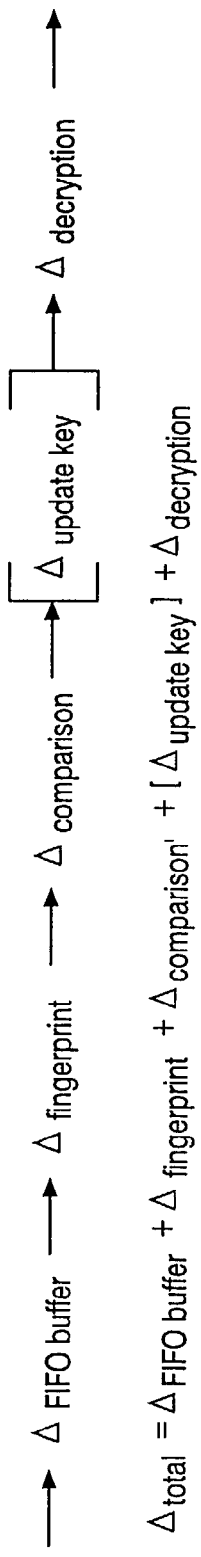

One of the positive features of the key update synchronization mechanism according to the present invention lies in the aspect of replacing the message M in the secured stream by its fingerprint and additionally transmitting the message itself out-of-band, as opposed to simply leaving the secured stream untouched and only transmitting the fingerprint F out-of-band. The following of the new procedure will offer the following advantages:

reducing of the required processing time and hence the delay incurred substantially no erroneous key updates during the lifetime of the product increased robustness of the overall procedure will be effected Regarding the first aspect hereabove, FIGS. 6a, 6b represent a basic sketch for appreciating the reduction of the delay at the receiver side. Now obviously, if instead of the encrypted data, rather the fingerprint F were transmitted out-of-band, the receiver device would have to continually calculate the fingerprints of each respective data sequence that it were to receive in its FIFO buffer, before being able to compare them to F. In other words, for each separate comparison, a fingerprint would have to be calculated beforehand, which would effectively introduce an additional calculation delay. However, by rather transmitting M out-of-band, only a single fingerprint need to be calculated for each new key, to wit F. The number of comparisons to be made remains effectively unchanged, but no additional delay will be introduced by effecting many separate fingerprint calculations. In particular, FIG. 6a shows the delay caused by the procedure according to the present invention. Obviously, two processing sequences are effected in parallel. In contradistinction, FIG. 6b illustrates the less advantageous organization, wherein all processing delays are present in series.

Furthermore, by using the final x bits that precede the actual key update position in the secured stream to transmit the fingerprint, the receiver is able to simultaneously decrypt x bits from the secured stream and also to compare those x bits with the calculated fingerprint, thereby further reducing the introduced delay.

Figure 7:
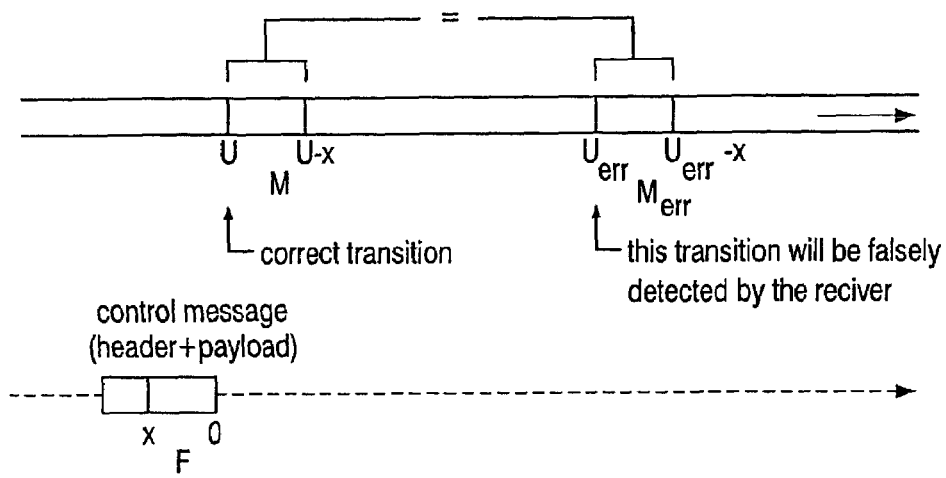
FIG. 7, a situation wherein the probability of an erroneous key update is non-negligible.

The feature that substantially no erroneous key updates will occur during the lifetime of the product is an important issue. If in contradistinction to the invention, the fingerprint F were transmitted out-of-band while the secured stream were left unchanged, erroneous key updates might in fact occur quite often, cf FIG. 7, that illustrates the situation when the probability of an erroneous key update is non-negligible. In fact, there is a certain non-negligible probability that the sequence of x bits gets repeated in the unsecured stream, and hence also in the secured stream, anywhere before the actual key update position. The receiver would then falsely identify that first occurrence as being the real key update position.

Figure 8:
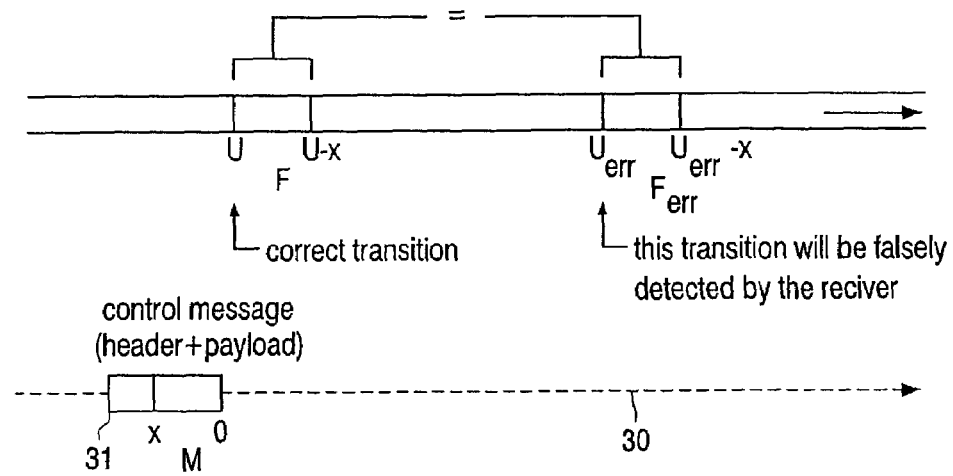
FIG. 8, a situation wherein the probability of an erroneous key update is negligible.

By in contradistinction transmitting the message M out-of-band and also replacing that message M by its fingerprint F in the secured stream however, the amount of erroneous key updates will be drastically reduced as shown in FIG. 8. This illustrates the situation wherein the probability of an erroneous key update is indeed negligible. Indeed, the probability that the secured stream will contain both an x bit message and also its x-bit fingerprint is very low. Moreover, by increasing the value of x and/or increasing the key update frequency, that probability may be further reduced. Through using appropriate parameter values, it may be able to state that during the product lifetime no erroneous key updates will effectively occur. Note that in the discussion on the probabilities, the term "stream" refers to that part of the secured content stream that has been encrypted with the current encryption key.

Finally, the increased robustness realized by the overall procedure is an important feature of the present invention as well. It is indeed impossible to force a key update without prior knowledge of the fingerprint function $f$. Therefore, a hacker cannot present his own chosen material to the receiver, then repeatedly force an update of the decryption key, and finally analyze the results by looking at the output of the receiver. Moreover, a hacker has no way to identify the position where the fingerprint is located in the secured content and therefore cannot identify the actual key update position.

The invention claimed is:

1. A method for communicating an information string between a source entity and a destination entity, the method comprising the acts of:
    encrypting said information string through a time-sequence of encrypting keys that are each valid only in a predetermined associated time interval within said string, for allowing as based on said time-sequence of encrypting keys said destination entity to decrypt said information,
    presenting the destination entity with control information regarding a changeover instant between two particular encryption keys,
    in said information string, singling out a data block at a predetermined localization in said string, which localization is known to said destination entity, encrypting said data block with an encryption key,
    forming a fingerprint of said encrypted data block,
    transmitting to said destination entity said fingerprint at said predetermined localization instead of said encrypted data block,
    and transmitting to said destination entity an out-of-band control message for indicating that an update occurred, said information string and said out-of-band control message being at different channels,
    wherein said control message contains said data block after encrypting, but before forming of the fingerprint.

2. The method as claimed in claim 1, wherein the transmitting of said control message is subjected to a variable delay interval with respect to the secured content containing said changeover.

3. The method as claimed in claim 1, wherein at any localization in said string only one key is active.

4. The method as claimed in claim 1, wherein said predetermined localization is the last block position within said string that uses the pre-existent encryption key.

5. The method as claimed in claim 1 and being applied to a secure link that is based on a block cipher algorithm being used for encryption/decryption.

6. The method of claim 1, further comprising the acts of: searching for a match with said encrypted data stream at said destination entity, upon finding such match, generating an indication for said changeover, and changing to a next decryption key associated to said sequence of encryption keys.

7. An apparatus comprising:
    encryption means for encrypting information through a time-sequence of encrypting keys that are each valid only in a predetermined associated time interval within an information string,
    presentation means for presenting a destination entity with control information regarding a changeover instant between two particular encryption keys,
    selection means for in said information string singling out a data block at a predetermined localization in said information string relative to a said changeover that is known to said destination entity, for encrypting said data block by said encryption means for forming an encrypted data block,
    fingerprinting means fed by said encrypting means for forming a fingerprint of said encrypted data block, and transmitting said fingerprint at said predetermined localization instead of said encrypted data block to said destination entity,
    and control messaging means for transmitting an out-of-band control message for indicating that an update occurred, said information string and said out-of-band control message being at different channels, wherein said control message contains said data block after encrypting, but before forming of the fingerprint.

8. The apparatus of claim 7 further comprising:
    receiving means for receiving said information string and said out-of-band control message, singling out a data block at a predetermined localization in said information string, and
    comparison search means fed by said receiving means for searching for a match with said encrypted data stream.

9. The apparatus as claimed in claim 7 for use with a stream cipher-based encryption procedure and being provided with an additional bit buffer for accommodating a said data block.

10. A transmission system comprising the apparatus as claimed in claim 7.

11. A signal embedded in a carrier, the signal comprising:
    an information string from a source entity being encrypted through a time-sequence of encrypting keys that are each valid only in a predetermined associated time interval within said string, for allowing as based on said time-sequence of encrypting keys a destination entity to decrypt said information,
    control information regarding a changeover instant between two particular encryption keys, and
    an out-of-band control message for indicating to said destination entity that an update occurred, said information string and said out-of-band control message being at different channels, wherein, in said information string, a data block is singled out at a predetermined localization in said string relative to a predetermined changeover position, said data block being encrypted with an encryption key, said information string including a fingerprint of said encrypted data block at said predetermined localization instead of said encrypted data block, wherein said encrypted data block is included in said out-of-band control message.

12. The signal as claimed in claim 11 and pertaining to dissemination of an audio and/or video content.

13. The method of claim 1, wherein said different channels are at different frequencies.

14. The apparatus of claim 7, wherein said different channels are at different frequencies.

15. A method of communicating a message in a stream comprising the acts of:

encrypting the message to form an encrypted message, wherein the encrypting act encrypts information in a string including the message through a time-sequence of encrypting keys that are each valid only in a predetermined associated time interval within said string;

forming a fingerprint of the encrypted message;

replacing the message with the fingerprint;

transmitting the stream including the fingerprint using a first channel;

transmitting the message using a second channel which different from the first channel; and transmitting control information regarding a changeover instant between two particular encryption keys.

* * * * *